United States Patent [19]

Morissette

[11] Patent Number: 4,632,289
[45] Date of Patent: Dec. 30, 1986

[54] AUTO COLLAPSIBLE LOAD CARRIER

[76] Inventor: Gilles Morissette, 7950 Jacques Rousseau Street, Apt. 403, Rivière-des-Prairies, Canada, H1E 1J6

[21] Appl. No.: 779,024
[22] Filed: Sep. 23, 1985
[51] Int. Cl.⁴ .............................................. B60R 9/00
[52] U.S. Cl. ................................................... 224/314
[58] Field of Search ........................ 224/314, 309, 331

[56] References Cited

U.S. PATENT DOCUMENTS

| 2,387,779 | 10/1945 | Strauss | 224/314 |
|---|---|---|---|
| 2,654,516 | 10/1953 | Edwards | 224/314 |
| 3,232,502 | 2/1966 | Kleinbortas | 224/314 X |
| 3,512,082 | 5/1970 | Joos | 224/314 |

FOREIGN PATENT DOCUMENTS

| 668560 | 12/1965 | Belgium | 224/314 |
|---|---|---|---|
| 1094249 | 5/1955 | France | 224/314 |
| 636311 | 4/1950 | United Kingdom | 224/314 |

Primary Examiner—Stephen Marcus
Assistant Examiner—Robert Petrik

[57] ABSTRACT

There is disclosed a collapsible load carrier for the roof of a hardtop motor vehicle. This carrier comprises an open frame defining a flooring, two end walls, and two side walls. Securing members releasably connect the frame to the roof of the car and are mounted to the end walls of the rack. The flooring is spaced from the roof, because the securing members extend downwardly below the level of the flooring. Each side wall is made of two sections interconnected by hinge members at the rack center. These hinge members enable the collapse of the side walls against the end walls, inwardly thereof. The flooring consists of two sections, each formed by spaced transverse rods which are rotatively interconnected by pairs of transversely-offset band-like rigid links. The sections are releasably interconnected at the center of the carrier and can be collapsed against the respective end walls. In the erected position of the carrier, the hinge members and flooring sections are interlocked, so as to prevent collapse of both side walls and both flooring sections.

4 Claims, 8 Drawing Figures

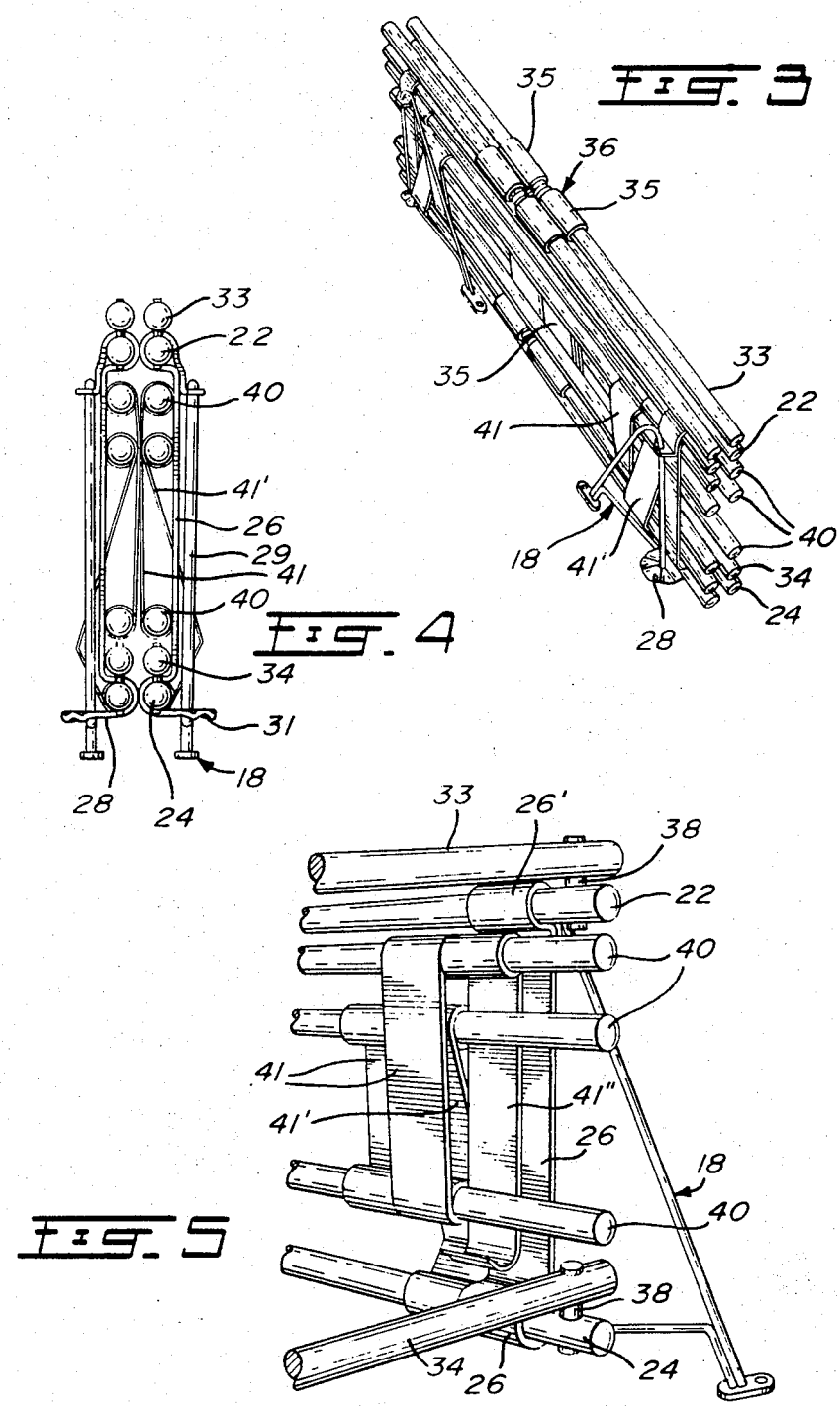

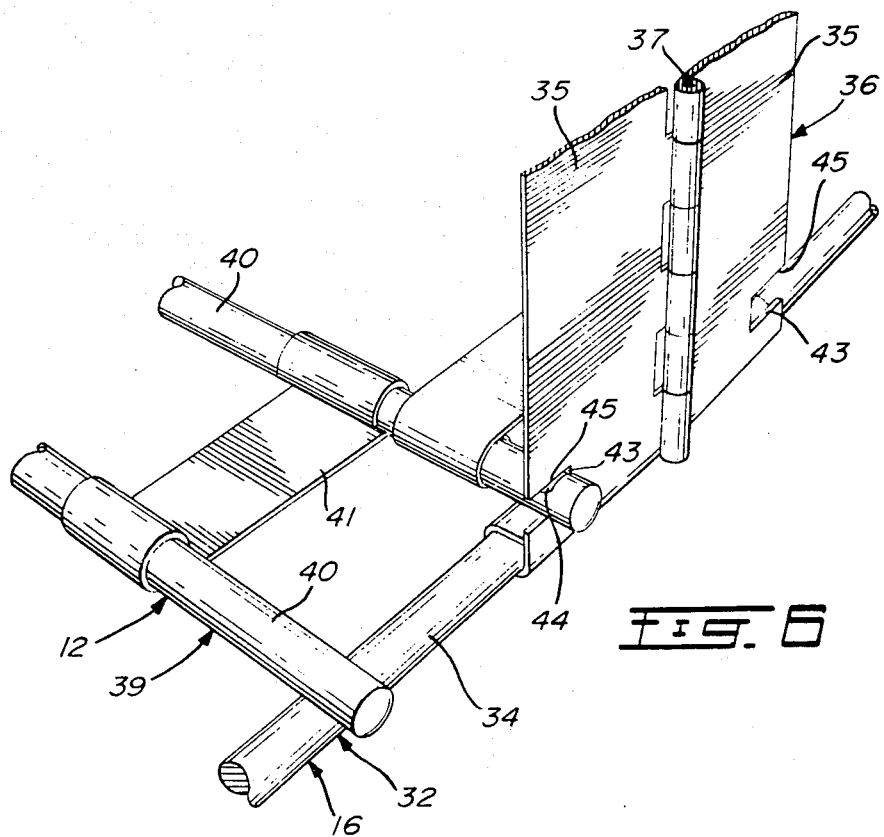
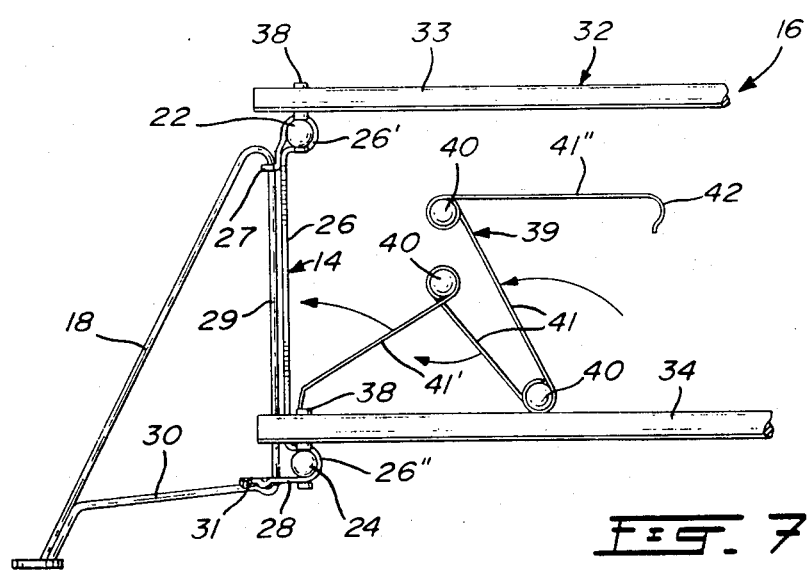

AUTO COLLAPSIBLE LOAD CARRIER

FIELD OF THE INVENTION

This invention relates to collapsible auto top luggage carriers for hardtop motor vehicles.

BACKGROUND OF THE INVENTION

Collapsible roof-top load-carriers are disclosed in U.S. Pat. Nos. 2,440,821, issued May 4, 1948 to Godwin, and 3,901,422, issued Aug. 26, 1975 to Anderson and Dorschner.

In Godwin, the frame of the rack can be folded in two, as shown sequentially in FIGS. 1 and 4, and consequently, this frame still takes much space in collapsed condition. In Anderson and Dorschner, the frame of the rack can be collapsed by flattening same, but its base cannot be folded.

It is believed that a more thorough collapsing can be achieved for rooftop luggage carriers.

OBJECT OF THE INVENTION

The object of the present invention is to provide a luggage carrier or rigid and sturdy construction and yet be collapsible into a most compact fashion.

Another object of the invention is to provide a carrier of the type defined, in which the side walls interlock with the flooring to form a rigid structure when the carrier is erected.

SUMMARY OF THE INVENTION

Accordingly with the stated objects of the invention, a collapsible load-carrier for the roof of a hardtop motor vehicle is provided. The carrier or rack comprises an open frame defining a flooring, two end walls and two side walls. Securing members, mounted to said end walls, releasably connect the frame to the vehicle roof, wherein the flooring is spaced from the said roof. First means permit collapse of said side walls against said end walls, inwardly thereof. Second means permit collapse of said flooring. Interlocking means releasably lock the said side walls with the said flooring against actuation of said first and second collapse means.

Said securing members are preferably collapsible against said end walls, outwardly thereof.

Each side wall preferably consists of two similar rigid side wall sections pivotally interconnected by a hinge member constituting part of the first collapse means. The flooring is also preferably made of two flooring sections, each pivotally attached to one end wall and each consisting of a number of transverse rods rotatably secured in consecutive pairs by rigid band-like links. Consecutive links are transversely offset and permit collapsing of said rods in pairs one above the other against the inside of the end walls, thereby defining the second collapsing means.

Each said hinge member preferably comprises two hinge leaves, each having a transverse notch for releasable engagement by the innermost transverse rod of each flooring section, thereby defining said interlocking means.

Preferably, each innermost rod has a topmost transverse groove at each end for receiving an edge of the hinge leaf corresponding notch.

Preferably, each of the securing members comprises a foot, transversely rotatively secured to the end walls and downwardly projecting therefrom, and a suction cup, fixedly secured to the outermost bottom end of said foot. Selective locating means retain the foot in any selected angular position relative to the rack.

Each foot preferably consists of a single rigid wire bent in a triangle, one side of which rotatively engages vertically-aligned top and bottom bored flanges secured to the end walls. Each bottom flange has a series of radial grooves at its underside selectively engaged by the horizontal side of the triangular wire foot under the weight of the rack frame, thus forming said selective locating means.

BRIEF DESCRIPTION OF THE DRAWINGS

FIGS. 3 and 4 are a perspective view and an elevational end view, respectively, of the said rack in its fully collapsed position;

FIG. 5 is an enlarged partial perspective view of a corner portion of the rack showing one floor section in collapsed condition;

FIG. 6 is an enlarged partial perspective view of the center portion of the erected rack;

FIG. 7 is a partial side elevation of the rack showing one floor section being collapsed.

DETAILED DESCRIPTION OF THE PREFERRED EMBODIMENT OF THE INVENTION

Figure 1:
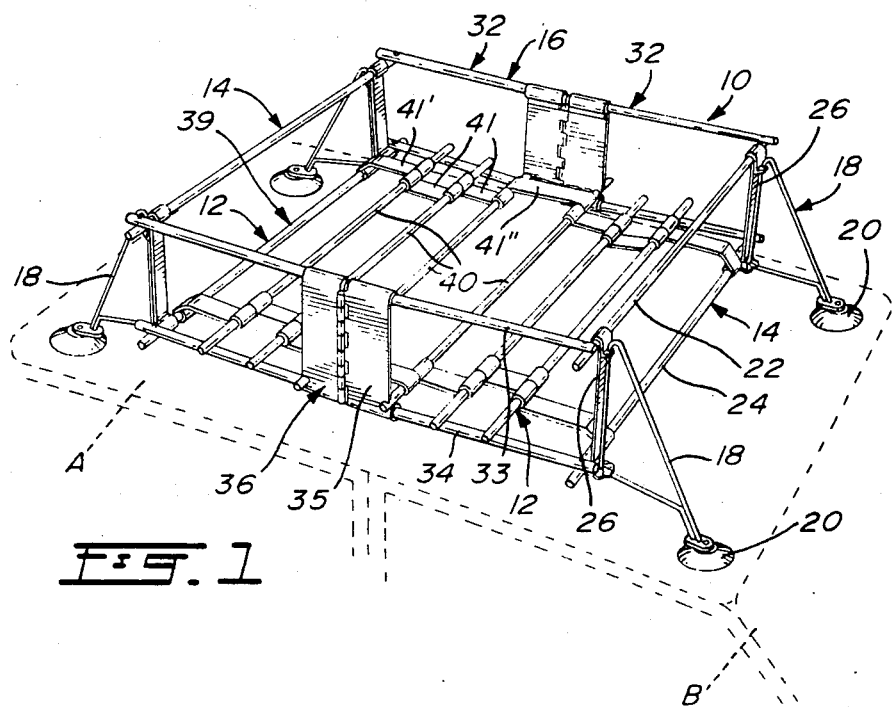
FIG. 1 is a downwardly-looking perspective side view of the erected rack supported by the roof of a car in dotted lines.

The rack, according to the preferred embodiment of the invention, is shown in FIG. 1 and is denoted 10. This rack 10 consists of an open frame defining a rectangular flooring 12, two end walls 14, two side walls 16, and two pairs of opposite feet 18 secured to the end walls and equipped with outer suction cups 20.

The rack 10 is conventionally secured to the roof A of a hardtop car B by applying the suction cups 20 flat thereagainst with end walls 14 preferably transverse to car B. The walls 14, 16 will confine a load over the flooring 12. Preferably, the rack is further attached to the car by flexible side straps (not shown) provided with hooks engaging under the roof side of gutters, as is conventional.

Each end wall 14 consists of a rectangular open frame, made of top and bottom horizontal rod members 22, 24, rigidly interconnected at both ends by rigid, upright metal straps 26. As clearly shown in FIG. 7, each strap 26 is curved round and welded to the rod members 22 and 24, as shown at 26' and 26", respectively. The top end of the strap 26 is bent at right angle to form an outwardly-projecting flange 27, while the lower end of the same strap 26 is outwardly directed to form a flange 28, both flanges 27, 28 having a hole in vertical register for rotatably receiving the vertical leg 29 of a rectangular wire frame, which constitutes a foot 18. The substantially-horizontal leg 30 of the foot 18 extends immediately underneath the lower flange 28 and the latter is provided with a series of equally-spaced radially-directed grooves 31 (see FIGS. 3 and 7) which are formed at the underface of flange 28 for releasably locating the horizontal leg 30. Thus, the foot 18 can be pivoted about a vertical axis and releasably retained in any selected horizontal position under the weight of the carrier, and also of its load. Thus, the orientation of the feet 18 can be adjusted in accordance with the particular curvature of the car roof to which the rack is secured, so as to provide optimum contact of the suction cups with said car roof. When the rack is in collapsed position, the feet 18 can be pivoted flat against the outside of the end walls 14, as shown in FIG. 3.

Figure 2:
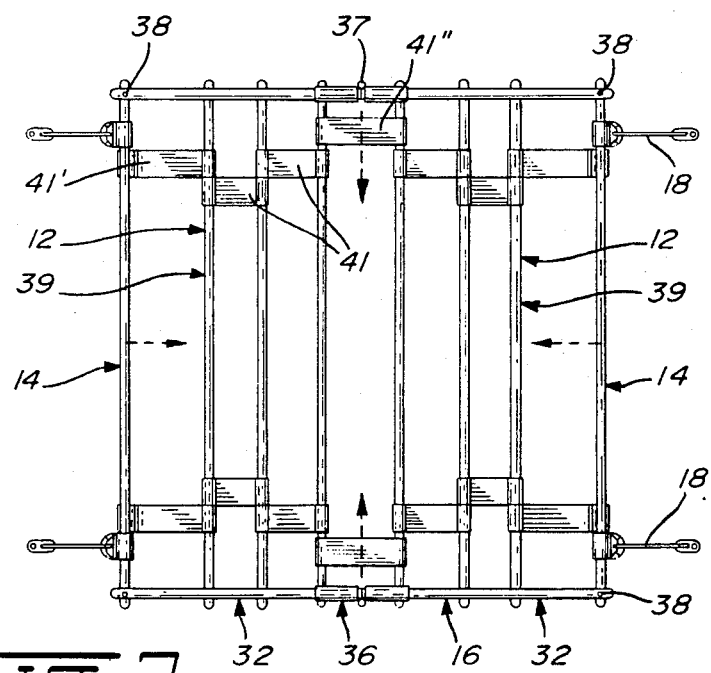
FIG. 2 is a top plan view of the erected rack.
Figure 8:
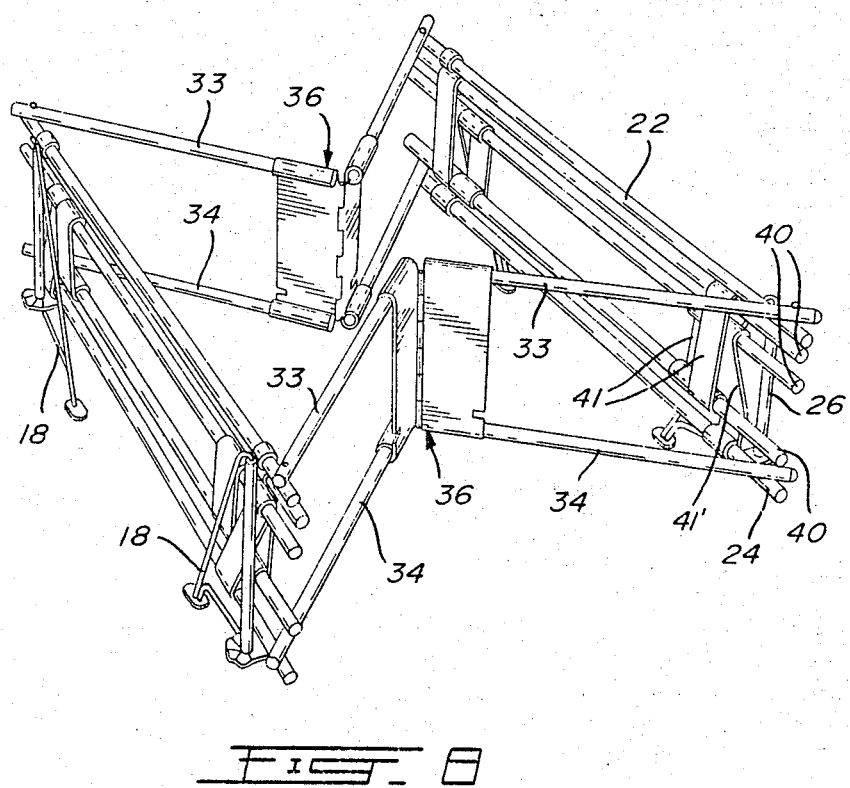
FIG. 8 is a perspective view of the rack, partially collapsed.

Each side wall 16 is composed of two side wall sections 32. Each section 32 consists of top and bottom, horizontal rigid rod members 33, 34, respectively, which are rigidly interconnected at one end by a hinge leaf 35 of a hinge member 36. Preferably, the top and bottom marginal portions of the hinge leaf 35 are curved around and welded to the ends of the rod members 33, 34. The two hinge leaves are interconnected to each other in conventional fashion by a hinge pin 37. The outer ends of the rod members 33 and 34 are pivotally connected to the outer ends of the top and bottom rod members 22 and 24 of the end walls 14, respectively, by hinge pins 38. Thus, the two side wall sections 32 may be folded in accordeon-like manner about hinge pins 37 and 38, so as to collapse inwardly of the rack while bringing the two end walls 14 together, as shown in dotted line in FIG. 2.

The flooring 12 similarly consists of two flooring sections 39; each flooring section consisting of a plurality of spaced parallel rod members 40, which extend transversely of the rack and which are adapted to rest at their outer ends on the bottom rod members 34 of the side wall sections 12 in the erected position of the rack. The rods 40 are pivotally connected two by two and maintained in spaced parallel relationship by means of pairs of rigid band-links 41 bent to form sleeves at their outer ends for surrounding the rods 40. Consecutive links 41 are transversely offset. The outermost band-like link 41' is bent to form a sleeve surrounding the bottom rod 24 of the end wall 14 for rotation around the same. The outermost rod 40 of one of the flooring sections 39 is similarly provided with a connecting end link 41". which, as shown in FIG. 7, has a hook-shape outer end 42 adapted to snap around the centermost rod 40 of the other flooring section 39 in the erected position of the car rack. As shown in FIG. 1 and also in FIG. 6, the free vertical edge of each hinge leaf 35 is formed with a notch 43 adjacent the top face of the bottom run 34 of the side wall section 32, said notch 43 adapted to engage the centermost rod 40 of the flooring section 39. More particularly, this centermost rod 40 is provided with a top transverse groove 44 for receiving the top edge 45 of the notch 43. Thus, in the erected position of the car rack with the two side wall sections 32 in mutual alignment on each side of the rack and with the two flooring sections 39 fully extended and resting on the lowermost run of the side wall of the rack, the centermost flooring rods 40 are maintained at their ends within the notches 43 by means of the connecting links 41". The side wall sections 32 are prevented from folding inwardly about the hinge member 36, because the top edge 45 of the notches 43 engage the grooves 44 of the flooring centermost rods 40 and, in turn, these notches 43 prevent lifting of the flooring rods 40 off the side wall lower runs 34.

The rack 10 is collapsed in the following manner. The connecting links 41" are unhooked from the centermost flooring rod 40 of the other flooring section. Both centermost rods 40 are pushed out of engagement with the respective notches 43 and the two flooring sections are collapsed against the inside surfaces of the straps 26 of the respective end walls 14 between and in the plane of top and bottom rod members 22 and 24, as shown in FIGS. 7 and 5. This is possible since links 41 and 41' are of unequal length and shorter than the distance between rod members 22 and 34. Then the two side wall sections on each side of the rack are collapsed inwardly about hinge pins 37, 38 to therefore fold the rack in accordeon-like fashion. In the final collapsed position of the rack, as shown in FIGS. 3 and 4, the flooring rods 40 of each flooring section 39 nest within the spaced defined by the top and bottom runs 22 and 24 of an end wall 14 and the top and bottom runs of the associated side wall section 32 lie over and along the top and bottom runs of the respective end walls. Therefore, in each end section of the collapsed rack, all of the rods or runs lie in a common plane, thus conferring to the collapsed rack a minimum thickness. The rack-supporting feet 18 are also folded against the outside of the end walls. Thus, the rack can be stored in a minimum of space.

What I claim is:

1. A collapsible roof top rack for erection on hard top motor vehicles, comprising: a quadrangular open frame defining a flooring, two end walls and two side walls with the erected rack adapted to be disposed with its end walls transverse to the motor vehicle, securing members mounted to the ends of the end walls to releasably connect the frame to the vehicle roof, with the flooring spaced above said roof; each side wall consists of two similar rigid side wall sections, of substantially equal length, each pivotally interconnected by a hinge member at their adjacent ends and also pivoted to the respective ends of the end walls at the outer ends thereof, said flooring consisting of two flooring sections comprising a plurality of spaced parallel flooring rods extending parallel to the end walls, band-like links pivotally spacedly interconnecting adjacent flooring rods but allowing folding of the latter against the inside of the respective end walls in accordeon-like fashion, and also pivotally interconnecting the outermost rod of each flooring section to the associated end wall; a connector band-like link pivoted to the centermost rod of one flooring section and releasably engageable with the centermost rod of the other flooring section; each end wall comprising a top and a bottom transverse end wall rod and two end wall straps rigidly interconnecting said top and bottom end wall rods at the end portions thereof, the flooring rods of each flooring section, in their folded position, nesting between and in the plane of the top and bottom end wall rods; each side wall section comprises a top and a bottom run respectively, pivotally connected to the top and bottom end wall rods, said hinge member including two hinge leaves and a hinge pin pivotally interconnecting said two hinge leaves, the two hinge leaves consisting of a band-like member folded at the top and bottom edge to surround and be secured to the respective top and bottom runs of the side wall sections, each hinge leaf having a notch adjacent the bottom run of the side wall section, said notch engageable by the end of the centermost rod of each flooring section to interlock said side wall section with said flooring section, wherein disengagement of said centermost rod from said notch allows folding of said flooring sections against said end walls.

2. A collapsible rack as defined in claim 1, wherein the outer ends of said centermost rod of each flooring section includes a transverse groove to engage the top edge of the notch of the associated hinge leaf.

3. A collapsible roof top rack as defined in claim 2, wherein each end strap is curved around and fixed to the top and bottom rod, respectively, of each end wall, the free ends of said straps defining top and bottom flanges outwardly protruding from the end wall, each flange having a hole in vertical register with the hole of the other flange, each securing member consisting of a single, rigid were bent into a triangle and having a vertical leg rotatably mounted within the holes of the top and bottom flanges, and a horizontal leg outwardly protruding from the end wall underneath the bottom flange and resting against the underside of the latter, said bottom flange having a plurality of radially-directed grooves at different angles to releasably receive the horizontal leg of said securing member and retain the latter in adjusted angular position with respect to the rack.

4. A collapsible roof top rack for erection on hard top motor vehicles, comprising: a quadrangular frame defining a flooring, two end walls and two side walls with the erected rack adapted to be disposed with its end walls transverse to the motor vehicle, securing members mounted to the ends of the end walls to releasably connect the frame to the vehicle roof, with the flooring spaced above said roof; each side wall consists of two similar rigid side wall sections, of substantially equal length, each pivotally interconnected by a hinge member at their adjacent ends and also pivoted to the respective ends of the end walls at the outer ends thereof, said flooring consisting of two flooring sections comprising a plurality of spaced, parallel flooring rods extending parallel to the end walls, band-like links pivotally spacedly interconnecting adjacent flooring rods but allowing folding of the latter against the inside of the respective end walls in accordeon-like fashion, and also pivotally interconnecting the outermost rod of each flooring section to the associated end wall; a connector band-like link pivoted to the centermost rod of one flooring section and releasably engageable with the centermost rod of the other flooring section; each end wall comprising a top and a bottom transverse end wall rod and two end wall straps rigidly interconnecting said top and bottom end wall rods at the end portions thereof, the flooring rods of each flooring section, in their folded position, nesting between and in the plane of the top and bottom end wall rods; each side wall section comprises a top and a bottom run respectively, pivotally connected to the top and bottom end wall rods, the band-like links interconnecting adjacent flooring rods having unequal lengths and being shorter than the distance between the top end wall rod and the bottom run of the side wall section to permit nesting of not only said flooring rods but also of said bottom run between and in the plane of said top and bottom end wall rods.

* * * * *